(12) United States Patent
Alabraba et al.

(10) Patent No.: US 7,702,536 B1
(45) Date of Patent: Apr. 20, 2010

(54) METHOD, SYSTEM, APPARATUS, AND COMPUTER-READABLE MEDIUM FOR TRACKING REFERRALS AND PRODUCT SELL-THROUGH

(75) Inventors: Ferdinand N. Alabraba, Bothell, WA (US); Aidan T. Hughes, Bellevue, WA (US); Parrish G. Munsell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1582 days.

(21) Appl. No.: 10/309,921

(22) Filed: Dec. 4, 2002

(51) Int. Cl.
*G06Q 30/00* (2006.01)

(52) U.S. Cl. .................. 705/14.16; 705/14.36; 705/26; 705/27; 705/56; 711/216

(58) Field of Classification Search ............... 705/14, 705/14.16, 14.35, 26, 27, 56
See application file for complete search history.

(56) References Cited

U.S. PATENT DOCUMENTS

| | | | | |
|---|---|---|---|---|
| 5,991,740 A * | 11/1999 | Messer | ......................... | 705/27 |
| 6,029,141 A * | 2/2000 | Bezos et al. | .................. | 705/27 |
| 6,134,533 A * | 10/2000 | Shell | ........................... | 705/26 |
| 6,275,919 B1 * | 8/2001 | Johnson | ...................... | 711/216 |
| 6,363,356 B1 * | 3/2002 | Horstmann | .................. | 705/26 |
| 6,408,281 B1 * | 6/2002 | Shell et al. | ..................... | 705/26 |
| 6,782,369 B1 * | 8/2004 | Carrott | .......................... | 705/1 |
| 6,871,188 B2 * | 3/2005 | De Souza | ..................... | 705/27 |
| 6,934,684 B2 * | 8/2005 | Alpdemir et al. | ............ | 704/265 |
| 7,103,643 B1 * | 9/2006 | Jacobs et al. | ................. | 709/219 |
| 2002/0052783 A1 * | 5/2002 | Turek et al. | .................... | 705/14 |

OTHER PUBLICATIONS

"Customer Referral Management: Optimal Reward Program" Eyal Biyalogorsky, Eitan Gerstner, Barak Libai; Marketing Science, vol. 20, No. 1. 2001. pp. 82-95.*

* cited by examiner

*Primary Examiner*—Jean Janvier
*Assistant Examiner*—Min Shin
(74) *Attorney, Agent, or Firm*—Merchant & Gould P.C.

(57) ABSTRACT

A method is provided for using referral data to track software product sell-through and compensate software product distributors. A referral identifier (ID), that identifies a product distributor, is associated with a product. The referral ID may be placed on or within the product container, or in the original equipment manufacturer (OEM) case, directly written to the registry or other storage of a new computer. During product activation, the referral ID is sent, along with other referral data, to a server computer where it is stored. Once the server computer determines that a purchase related to the product has occurred, the server retrieves the referral data to identify the referring product distributor, the product involved, the date the product was activated, the date the related purchase was activated, and other related parameters. The referral data may then be audited and used to determine compensation for the identified product distributor.

26 Claims, 8 Drawing Sheets

METHOD, SYSTEM, APPARATUS, AND COMPUTER-READABLE MEDIUM FOR TRACKING REFERRALS AND PRODUCT SELL-THROUGH

TECHNICAL FIELD

The present invention generally relates to computer systems having referral and product sell-through tracking capabilities. More specifically, the present invention relates to computer systems for tracking the distribution of software products and providing compensation to the distributors.

BACKGROUND

Customer brand loyalty and predominant market share are coveted positions in the product sales industry as a whole. The computer software industry is no exception. Research has shown that people who use a computer software product for a period of time grow accustomed to using that software and are not easily influenced to change to the software product of a competitor. As a result, software companies give customers opportunities to use trial versions of their software products for little or no initial cost. This has proven to be an effective means of gaining market share and repeat customers willing to spend more for unlimited versions of the products.

Software companies place their trial products in the hands of customers in a variety of ways. For example, Internet service providers ("ISPs") such as AMERICA ONLINE market their products by giving customers free on-line minutes with the expectation of gaining customer loyalty and repeat subscriptions to their service. Unlike other software products, the value in an ISP product is provided by remaining connected to the service. This gives an ISP significant control over the benefits of their product. However, software companies that have less control over the benefits of their trial products mitigate the risk of software piracy by offering trial versions that are diminished in value by restricting the functionality of the software. As a result, the customer does not receive the full product experience, thereby reducing the likelihood of subsequent purchases based on the trial experience.

In order to give customers the full product experience for a minimum cost and mitigate the risk of code piracy, software companies use product activation. Product activation is anti-piracy code that requires customers to connect to a server and receive a license from the software product manufacturer before the trial software product is enabled. Once the trial product is activated it is enabled on the customer computer for a fixed period of time. After the trial period has expired, the functionality of the software product is reduced with the expectation that the customer purchase the non-trial version of the software product at the full price. Reduced functionality permits some use of the product but prohibits saving changes or creating new documents, thereby motivating customers to purchase the non-trial version. In the past, the majority of customers went to retail distributors to purchase non-trial versions of software products, thereby providing profit margins directly to the distributors.

Software product distributors are important to the software sales industry because they place the software in the hands of customers and help software manufacturers build brand loyalty and market share. However, product activation opens opportunities for software manufactures to conduct business directly with the end-user customers. One drawback of product activation technology is that the advent of convertible trials and subscription services threatens software distributor profit margins. Convertible trials and subscription services permit customers to purchase time-limited software from a software distributor or manufacturer at a low cost and then purchase an unlock code for full price directly from the manufacturer to gain or renew access to the non-trial product. Although customers may still purchase non-trial software directly from distributors, purchases directly from the manufacturer could potentially lower profit margins for distributors, put the distributor-manufacturer relationship at risk, and threaten distribution channels for software manufacturers.

Therefore, in light of the above, there is a need for a method, system, apparatus, and computer-readable medium that can provide software customers with the full product experience at a low introductory cost, yet at the same time keep software product distributors involved with the ongoing customer relationship. There is a further need for a trustworthy method, system, apparatus, and computer-readable medium that tracks the distribution of software product sales in order to compensate the distributors.

SUMMARY OF THE INVENTION

The present invention satisfies the needs described above by providing a method, system, apparatus, and computer-readable medium for using referral data to track product sell-through that keeps software product distributors involved in the ongoing customer relationship. Moreover, the present invention provides a method, system, apparatus, and computer-readable medium for providing referral data for product distributors and authorized third parties to audit and to help determine compensation for software product distributors based on their distribution of software products.

Generally described, the present invention provides a method for using referral data to track software product sell-through and compensate software product distributors. According to the method, a referral identifier ("ID") that identifies a product distributor is associated with a product. The referral ID may be associated with a software product by placing a label showing the referral ID on the product container. The referral ID may be subsequently entered and stored when a customer installs the product and enters the referral ID. Alternatively, an original equipment manufacturer ("OEM") may associate the referral ID with software products on a computer by writing the referral ID to the registry, hard disk, or other storage of the manufactured computer.

Once the referral ID has been entered and stored, during product activation it is sent, along with other referral data, to a server computer where it is also stored. Referral data may be sent to the server computer by the telephone or the Internet. Also through product activation, the server computer may be informed that a purchase related to the product has occurred.

Once the server computer determines that a purchase related to the product has occurred, the server retrieves the referral data to identify the referring product distributor, the product involve, the date the product was activated, the date the related purchase was activated, and other related parameters. The referral data may then be used to determine compensation for the identified product distributor. Product distributors and authorized independent third parties may also audit the referral data to enhance its reliability.

The present invention also provides a system, apparatus, and computer-readable medium for using referral data to track software product sell-through and to compensate product distributors. Additional details regarding the various embodiments of the present invention will be provided in the detailed description that follows.

DETAILED DESCRIPTION

Figure 1:
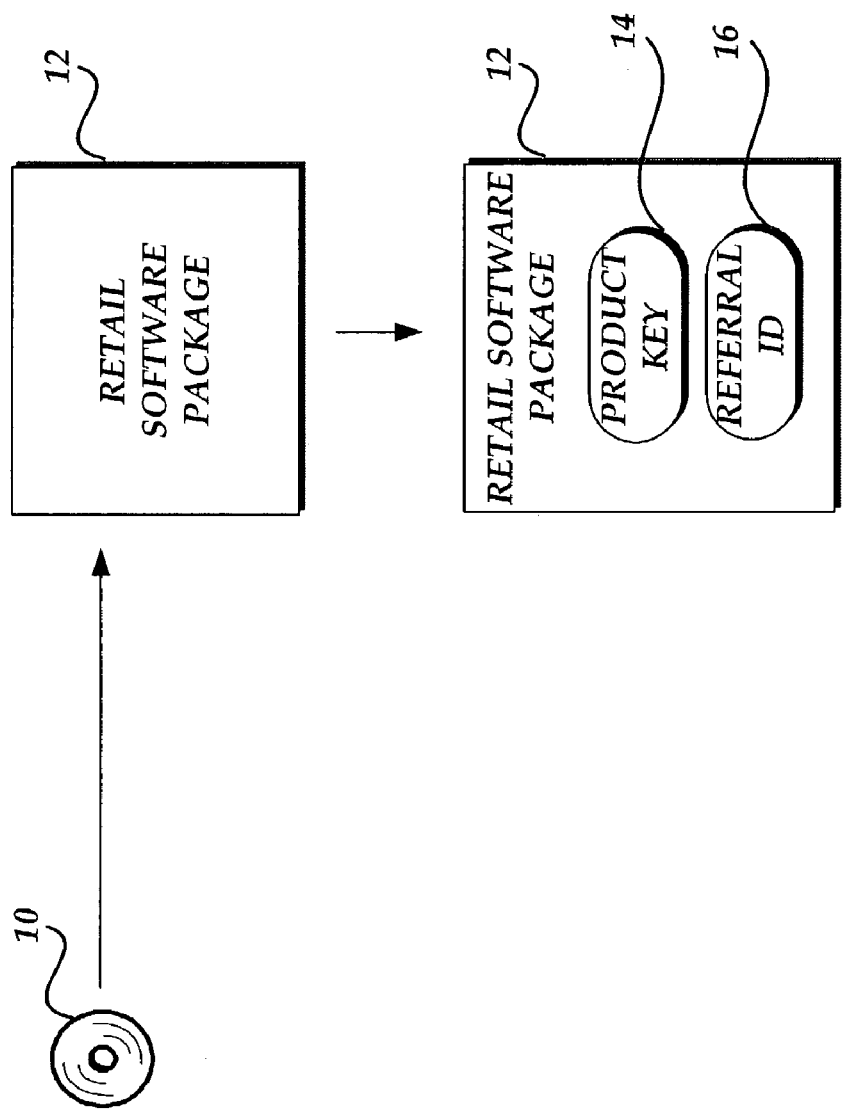
FIG. 1 is a diagrammatic illustration of a manufacturing and packaging process for producing a software product with labels.

As described above, the present invention provides a method, system, apparatus, and computer-readable medium for using referral data to track software product referrals and product sell-through, and to determine compensation for product distributors. According to one actual embodiment of the present invention a CD-ROM ("CD") containing software is provided by a product manufacturer. The CD is manufactured to provide the user access to full, restricted, or trial features of the product depending on a product key included with the CD. Product keys are unique codes that unlock varied degrees of functionality for the software product. For instance, a user may purchase a trial version of the software product for a minimal price, and receive a product CD in a trial box along with a product key that unlocks the trial version of the software product. Another user may purchase a full version of the same software product paying the full retail price, and receive the same product CD but in a different box and with a different product key. The different product key unlocks the full version of the software product. According to various embodiments of the invention, the software product may also come with a referral ID, assigned to identify the product distributor selling or distributing the software product and in some cases identify the product being sold. Additional details regarding the product key and the referral ID will be described below with respect to FIGS. 1-7.

Once the user purchases the product and installs the product on a computer, the user is prompted to enter the product key sold with the software product and the referral ID. Entry of the product key is required. However, entry of the referral ID may be optional. Alternatively, referral IDs may be written to a computer registry or other storage media on a manufactured computer by an OEM before the computer is sold to the customer. Once entered on the computer, the product key and referral code are stored and, as part of a required transaction to enable the installed product to operate, sent by telephone or the Internet to a server computer.

When received at the server computer, the product key and referral ID are stored in a database. The server computer may then send a license ID back to the customer computer where it is stored and used to enable the software product accordingly. In the case of a time-limited product, the user may be prompted to make a purchase related to the initial software product. When the user makes the purchase at a retail store or directly from the manufacturer, the user receives another product key to convert the limited product to the purchased version. Additional details regarding purchasing software upgrading or conversions directly from the software manufacturer will be described below with reference to FIG. 6.

Once the user enters the conversion product key, the user may be prompted to connect to the server computer again to enable the software product just purchased. During transmission over the telephone or Internet, the original license ID is transmitted along with the second product key. The original license ID is used to identify referral data sent to the database during the original purchase. This data is then used to identify the product distributor involved in the original software product transaction, the dates of activation, expiration, and conversion, the products purchased, and whether the related purchase was directly from the manufacturer. Further, the data may be audited and used to determine compensation for product distributors involved in the referral and product sell-through. Additional details regarding the acquisition and use of referral data will be described below with reference to FIGS. 5A-B. Referral IDs are produced and approved by a referral code generator utilizing a hashing algorithm. Additional details regarding the referral code generator will be described below with reference to FIG. 7.

Turning now to the figures, in which like numerals represent like elements, one actual embodiment of the present invention will be described. Those skilled in the art should appreciate that the actual embodiment described herein is illustrative and that changes may be made to the embodiment of the present invention described herein without departing from the spirit and scope of the invention.

Referring now to FIG. 1, a diagrammatic illustration of a manufacturing and packaging process to produce a labeled software product will be described. As shown in FIG. 1, a manufacturer creates a software product having unlimited functionality and writes the code to a disk 10, such as a CD-ROM, DVD-ROM or floppy diskette. The disk 10 is packaged in a retail box 12 or other type of packaging. The manufacturer generates and assigns a product key 14 that uniquely identifies the product and determines the level of functionality provided by the software product. For instance, the product key 14 might consist of a manufacturer ID, a serialized incrementing number and other identifying characters that control the functionality of the software depending on the product version that is purchased. For example, a trial product key may limit use of the software to thirty days, whereas a conversion product key may provide perpetual use of the software product. The functionality of the program may also be limited, such as by restricting the saving or printing of documents. The product key is printed on a label 14 and affixed somewhere on the product 12, such as a CD case, or on the instruction manual.

The manufacturer also generates and assigns a referral ID that uniquely identifies a particular distributor of the software product. For instance the referral ID may include the name of the distributor with other unique ID characters for the entity as a whole. The referral ID is then printed on a label 16 and affixed on the product near the product key 14. Alternatively the referral ID and product key may be pre-printed on the media cases. Additional details regarding the disk 10, the product key 12, and the referral ID 14 will be provided below.

Figure 2:
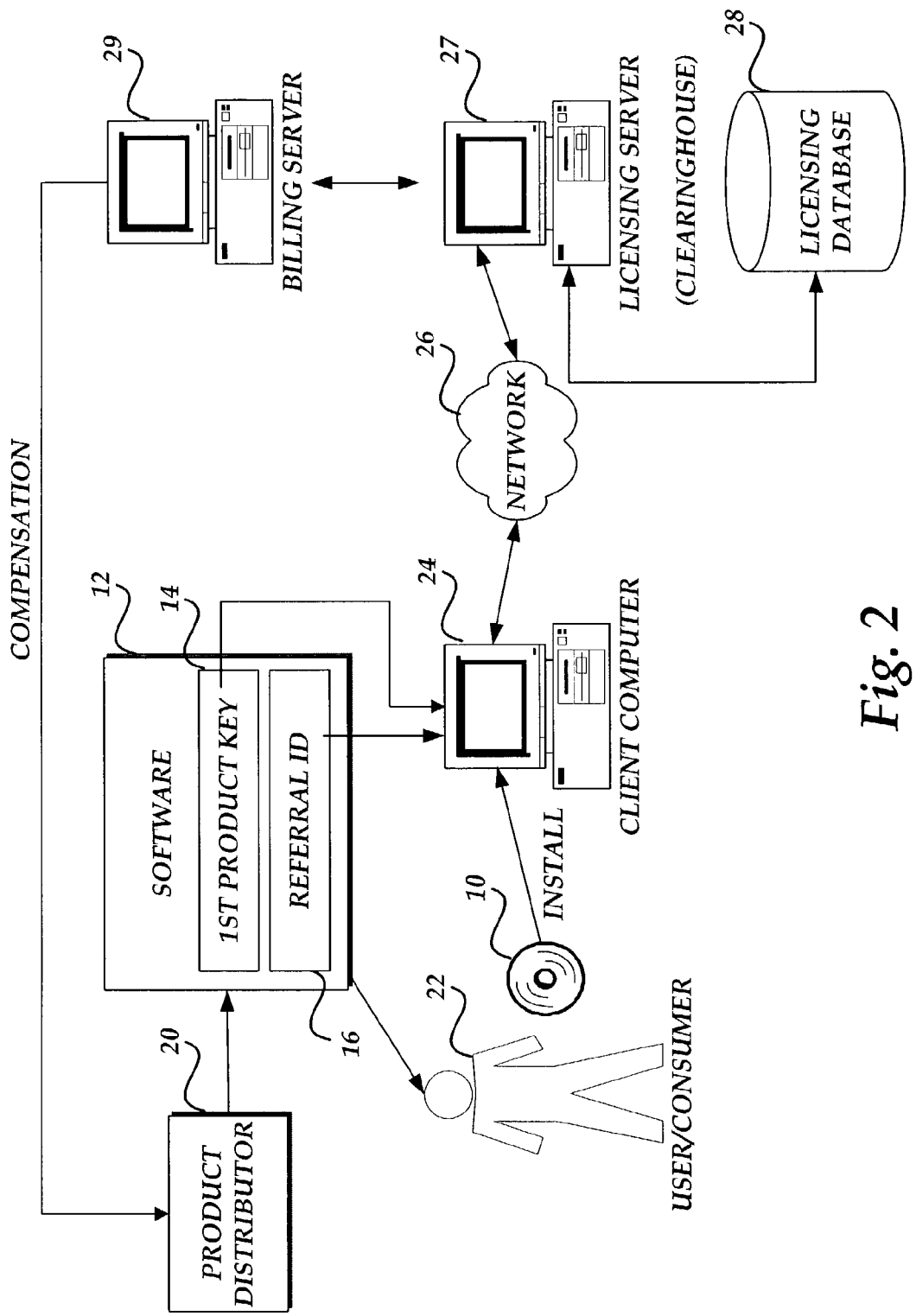
FIG. 2 is an architecture diagram showing an illustrative computer system architecture utilized in an actual embodiment of the present invention.

Turning now to FIG. 2, a block diagram showing an illustrative method and system architecture 21 utilized in an actual embodiment of the present invention will be described. According to one embodiment, the customer 22 obtains the software product package 12 from a product distributor 20. For instance, the customer 22 may purchase a trial version of a software product from product distributor 20 at a price less than the price for an unlimited version of the software product. Alternatively, the trial version may be provided free of charge. The product key 14 determines the functionality of the software product contained on the disk 10. The customer 22 installs the software contained on the disk 10 onto the client computer 24.

During installation, the customer 22 is prompted to enter the product key 14 and the referral ID 16. Entry of the referral ID 16 may be optional but the product key 14 is required. Alternatively, if the product distributor 20 is an OEM, the referral ID 16 may be written directly to the client computer 24 by the product distributor 20. For instance, the referral ID 16 may be stored in a registry on the computer 24. Once installed on the client computer 24, the product key 14 and the referral ID 16 may be used to track referrals and product sell-through, for audit purposes, and to compensate the product distributor 20. In order to provide this functionality, a client computer 24, a licensing server 27, a database 28, and a billing server 29 are provided.

The client computer 24 and licensing server 27 are interconnected by a network 26 to provide data communication. In the absence of a customer computer's access to a network, the customer may gain access to the licensing server via a telephone. The licensing server 27 and the billing server 29 are also interconnected by a network and operate cooperatively to determine compensation for the product distributor 20 and provide audit capability. Additional details regarding each of these components will be provided below.

Figure 3:
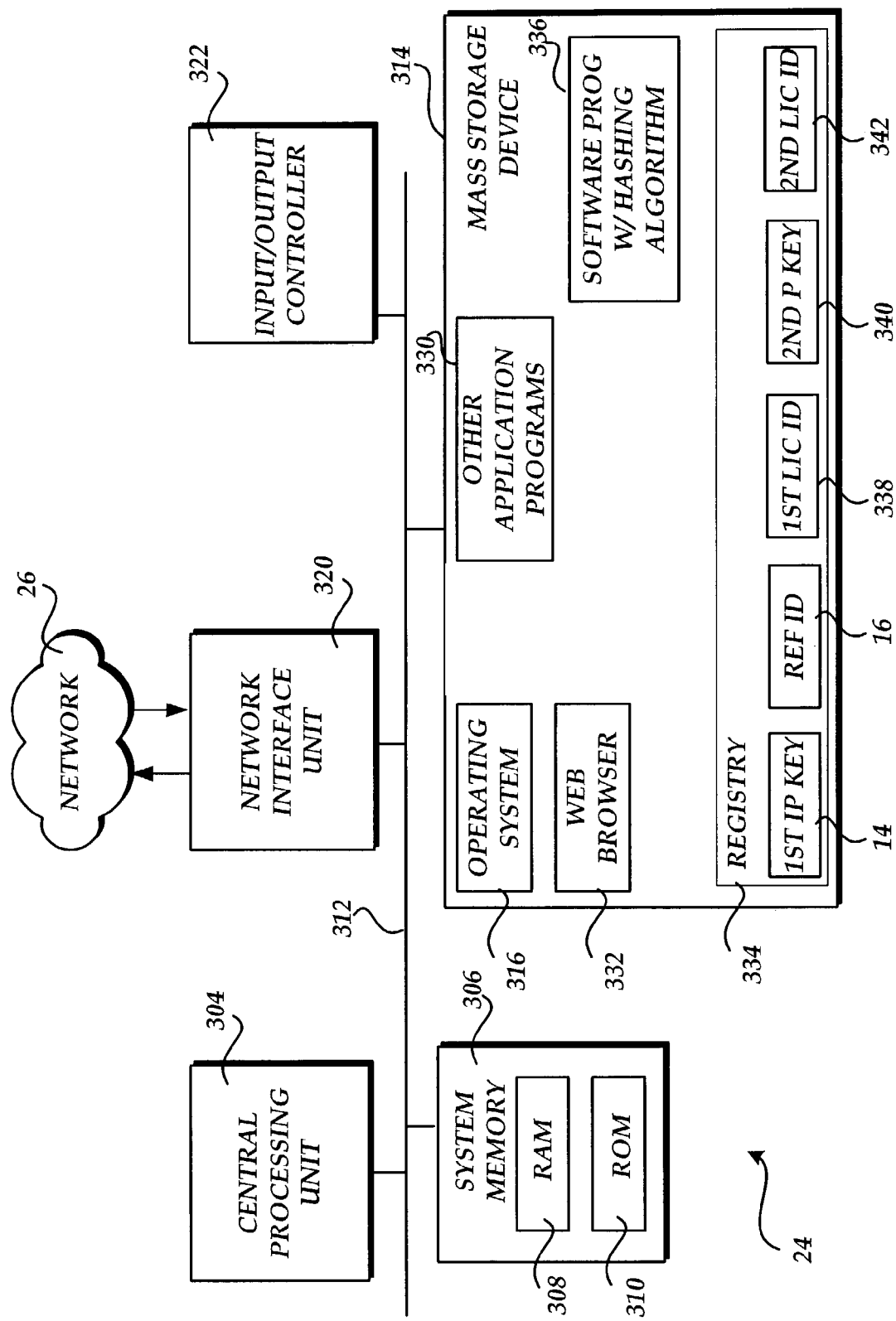
FIG. 3 is a hardware architecture diagram showing a computer architecture for a client computer utilized in an actual embodiment of the present invention.

Turning now to FIG. 3, an architecture diagram showing a computer architecture for a client computer 24 for practicing the various embodiments of the invention will be described. The computer architecture shown in FIG. 3 illustrates a conventional personal or client computer, including a central processing unit 304 ("CPU"), a system memory 306, including a random access memory 308 ("RAM") and a read-only memory ("ROM") 310, and a system bus 312 that couples the memory to the CPU 304. A basic input/output system containing the basic routines that help to transfer information between elements within the computer, such as during startup, is stored in the ROM 310. The client computer 24 further includes a mass storage device 314 for storing an operating system 316, application programs 330, such as the purchased software program 336 loaded from disk 10 complete with a hashing algorithm for transmitting referral IDs by telephone, and, data from the registry 334.

The mass storage device 314 is connected to the CPU 304 through a mass storage controller (not shown) connected to the bus 312. The mass storage device 314 and its associated computer-readable media, provide non-volatile storage for the client computer 24. Although the description of computer-readable media contained herein refers to a mass storage device, such as a hard disk or CD-ROM drive, it should be appreciated by those skilled in the art that computer-readable media can be any available media that can be accessed by the client computer 24.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the client computer 24 may operate in a networked environment using logical connections to remote computers through a network 26, such as the Internet. The client computer 24 may connect to the network 26 through a network interface unit 320 connected to the bus 312. It should be appreciated that the network interface unit 320 may also be utilized to connect to other types of networks and remote computer systems. The client computer 24 may also include an input/output controller 322 for receiving and processing input from a number of devices, including a keyboard, mouse, or electronic stylus (not shown in FIG. 3). Similarly, an input/output controller 322 may provide output to a display screen, a printer, or other type of output device.

As mentioned briefly above, a number of program modules and data files may be stored in the mass storage device 314 and RAM 308 of the client computer 24, including an operating system 316 suitable for controlling the operation of a networked client computer, such as the WINDOWS XP operating system from MICROSOFT CORPORATION of Redmond, Wash. Referral data within the system registry 334 may also be stored. Referral data stored on client computer 24 may include a first product key 14, a referral ID 16, a first license ID 338, a second product key 340, and a second license ID 342. As will be discussed in greater detail below, the referral data is transmitted by the client computer 24 to the server computer 27 via network 26.

The mass storage device 314 and RAM 308 may also store one or more application programs. In particular, the mass storage device 314 and RAM 308 may store a Web browser application program 332. The Web browser application 332 comprises a conventional Web browser application program such as INTERNET EXPLORER available from MICROSOFT CORPORATION of Redmond, Wash. or NETSCAPE NAVIGATOR from NETSCAPE CORPORATION. Additional details regarding the operation of the Web browser 332 and the software product application program 336 will be described in greater detail below.

Figure 4:
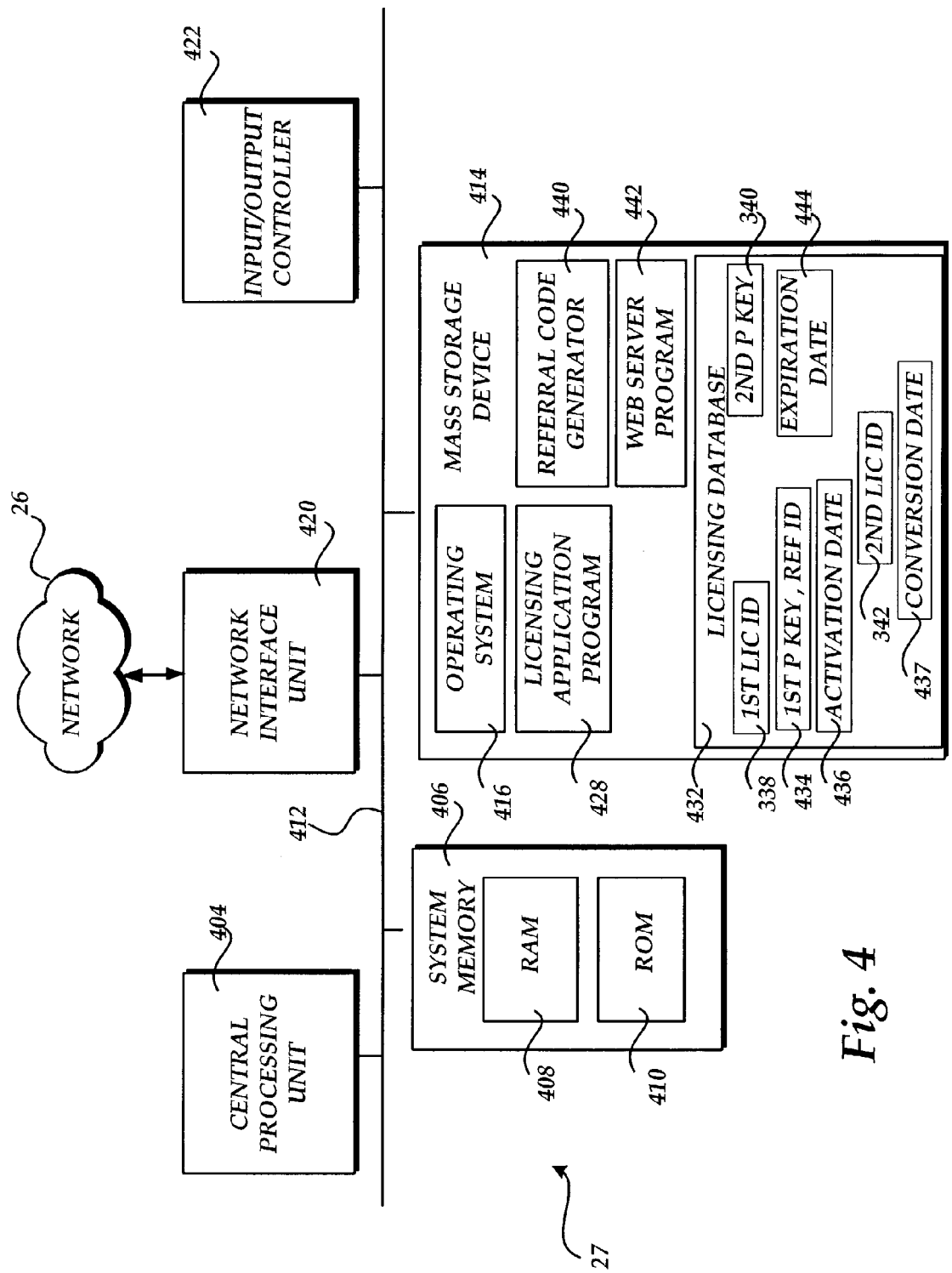
FIG. 4 is a hardware architecture diagram showing a computer architecture for a server computer utilized in an actual embodiment of the present invention.

Turning now to FIG. 4, an architecture diagram showing a computer architecture for a server computer 27 utilized in an actual embodiment of the present invention will be described. It should be appreciated that the server computer 27 contains many of the same conventional computing components as the client or personal computer 24 described above with respect to FIG. 3. Additionally, the server computer 27 stores referral data generated at the server computer 27 and received by server computer 27 via the network 26 from the client computer 24. This data is stored in the database 432 and may be audited by product distributors and other authorized parties. Referral data stored on server computer 27 also includes an associated first product key and referral ID 434, an activation date 436 for the first license ID 338, an expiration date 444 for the first license ID 338, and a conversion date 437 which is the issue date of the second license ID 342.

The mass storage device 414 and RAM 408 may also include a licensing application program 428 and a referral ID or referral code generator 440. The licensing application program 428 is utilized to provide license IDs 338 and 342 to the client computer 24 upon request for product activation. The referral ID generator application 440 is a program that utilizes a hashing algorithm to provide or approve a referral ID 16 before it is assigned to product distributor 20. The referral ID generator may be stored on any computer as long as it is not accessible to external clients or entities. Additional details regarding the operation of the licensing application program 428 and the referral ID or referral code generator 440 will be provided below.

Figure 5A:
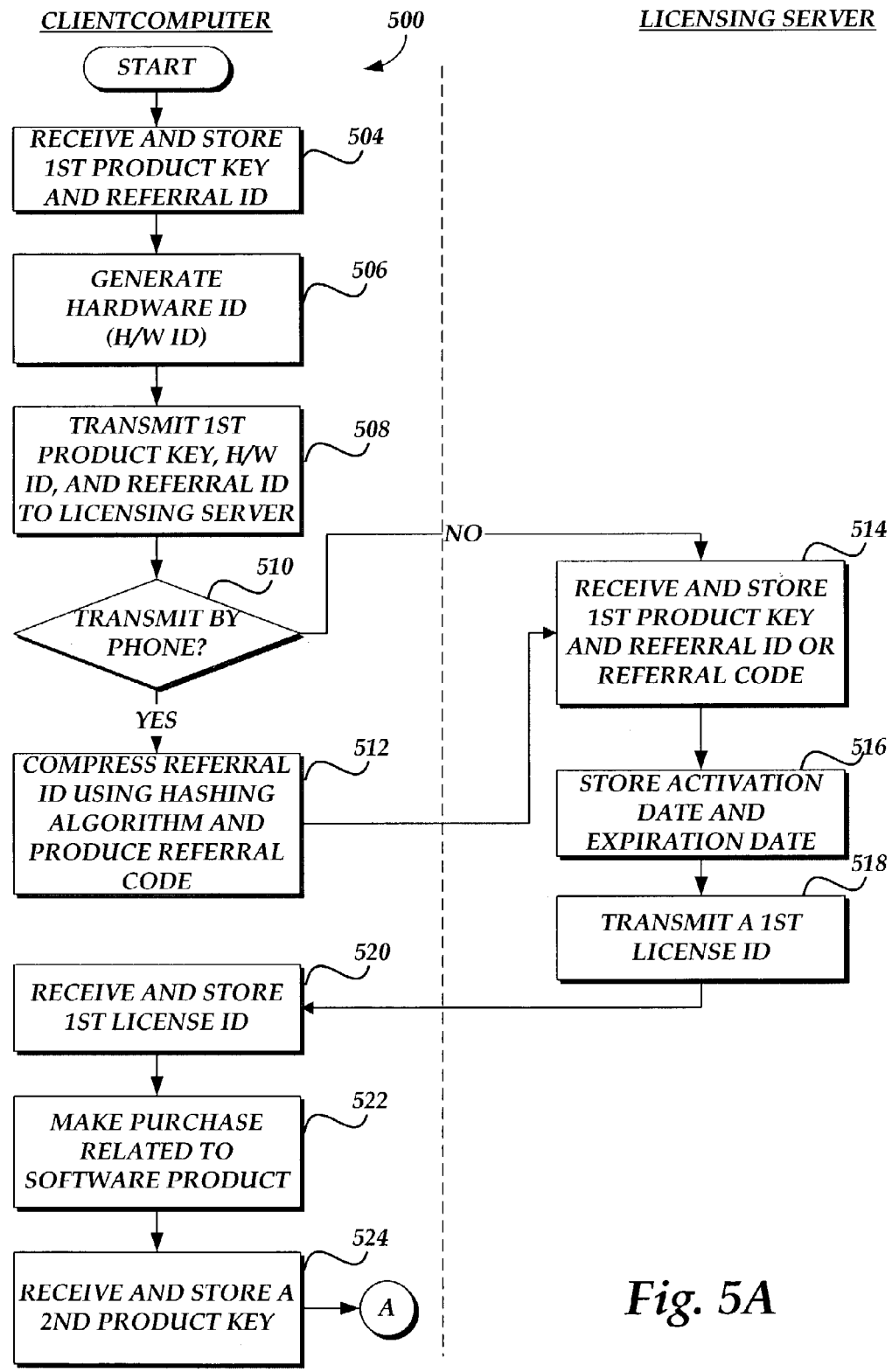
FIGS. 5A-B are flow diagrams illustrating the operation of a referral tracking client/server system provided in an actual embodiment of the present invention.
Figure 5B:
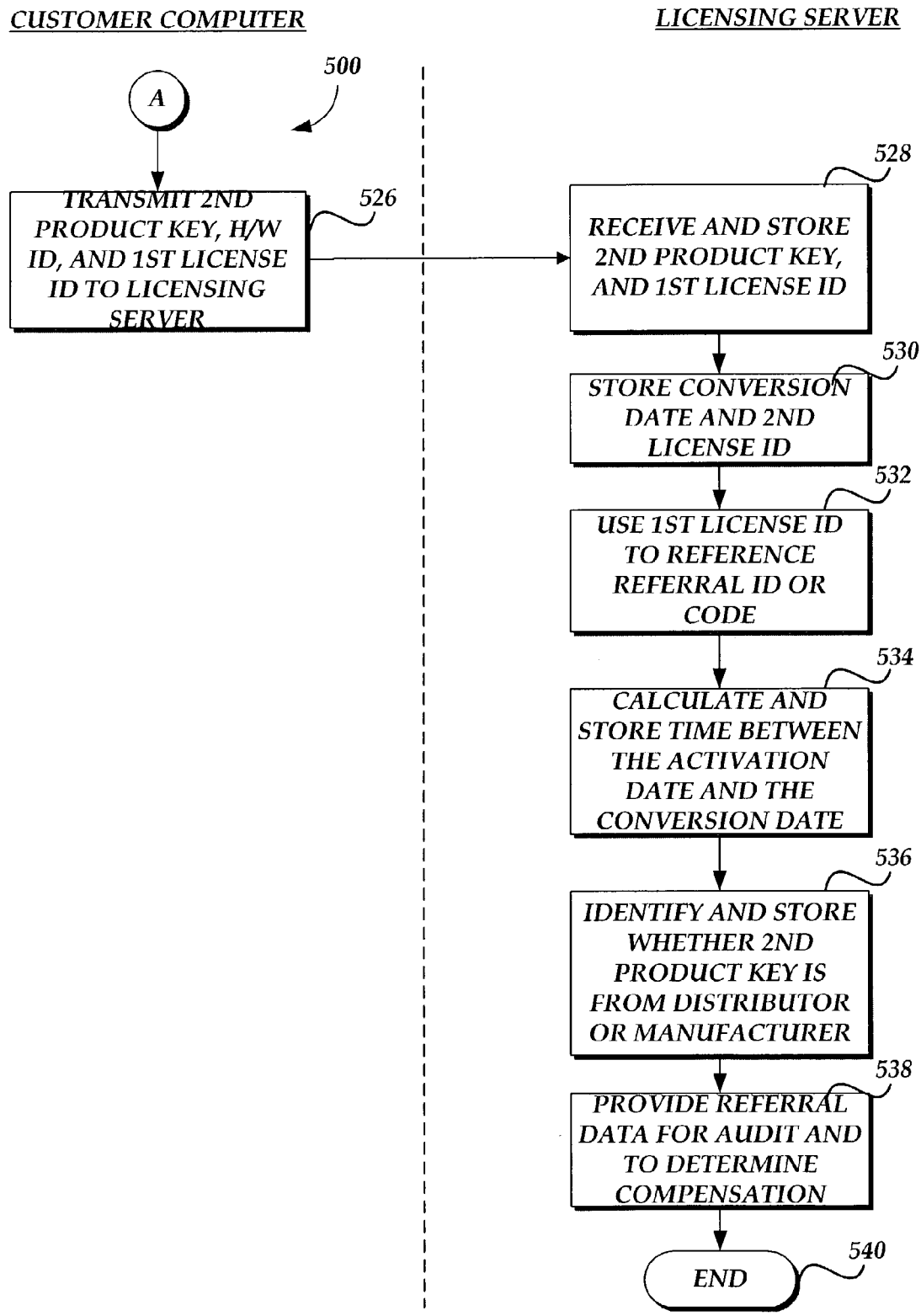

Turning now to FIGS. 5A-B, routine 500 illustrating the operation of a referral tracking client/server system provided in an actual embodiment of the present invention will be described. Once a referral ID 16 has been generated and assigned to a product distributor 20 and the customer 22 has obtained the software product 12 and installed it on the client computer 24, the routine 500 begins at block 502, where the client computer displays a request for the product key 14 and the referral ID 16. The routine 500 continues from block 502 to block 504, where the first product key 14 and referral ID 16 are received from the user and stored at the client computer 24.

Next, the routine 500 continues from block 504 to block 506, where a hardware ID is generated. A hardware ID uniquely identifies the hardware that comprises the client computer. Next, the routine 500 continues from block 506 to block 508 where the first product key 14, the hardware ID, and the referral ID 16 are transmitted to the licensing server 27. The routine 500 then continues from block 508 to block 510 where a determination is made as to whether the transmission is being made via telephone. If the transmission is by telephone, the routine 500 continues from block 510 to 512 where a hashing algorithm is used to compress the referral ID to produce a referral code before transmission. The referral code is a shortened version of the referral ID. If the transmission is not by telephone, the routine 500 continues from block 510 to block 514, where the server computer receives and stores the first product key 14 and the referral ID 16 sent at block 510.

From block 514, the routine 500 continues to block 516, where an activation date 436 and expiration date 444 are stored. The activation date 436 represents the date the first license ID 338 was issued and the expiration date 444 represents the date the first license ID 338 will expire. Next, the routine 500 continues from block 516 to block 518, where a first license ID 338 is transmitted to the client computer 24. The first license ID 338 enables the installed product application 336 to operate. The routine 500 then continues from block 518 to block 520, where the first license ID 338 is received and stored at the client computer.

From block 520, the routine 500 continues to block 522, where a purchase related to the software product disk 10 is made. For instance, a customer who originally purchased a trial version of the software product may purchase an unlimited version of the previously installed trial product. Alternatively, a customer who purchased a subscription version of the software product may purchase a renewed subscription. Further, a customer who purchased the unlimited version of the software product may purchase a subscription version. Additional details regarding online purchases directly from the product manufacturer will be described below.

The routine 500 then continues from block 522 to block 524, where a second product key 340 is received and stored at the client computer 24. A second product key 340 is obtained in response to a purchase related to the software product disk 10, and may convert the software stored on the disk 10 to a different version software product. For instance, a time-limited or functionality limited version may be converted to an unlimited version by the acquisition of a second product key 340. Next, the routine 500 continues from block 524 to block 526, where the second product key 340 and the first license ID 338 are transmitted to the server computer 27.

The routine 500 continues from block 526 to block 528, where the referral data sent at block 526 is received and stored. Next, the routine 500 continues from block 528 to block 530, where a conversion date 437 and second license ID 342 are stored. A conversion date 437 is the date the second license ID 342 is issued. The routine 500 then continues to block 532, where the first license ID 338 is used to reference the corresponding referral data. The routine 500 then continues from block 532 to block 534, where the difference between the install date 434 and the conversion date 437 may be determined.

From block 534, the routine 500 continues to block 536 where a determination may be made as to whether the second product key 340 was purchased directly from the product manufacturer and stored. Blocks 534 and 536 may also be executed on the billing server 29. The routine 500 then continues from block 536 to block 538, where the referral data is made available to a billing server 29 for auditing and to determine compensation for the product distributor 20. The routine 500 then terminates at block 540.

Figure 6:
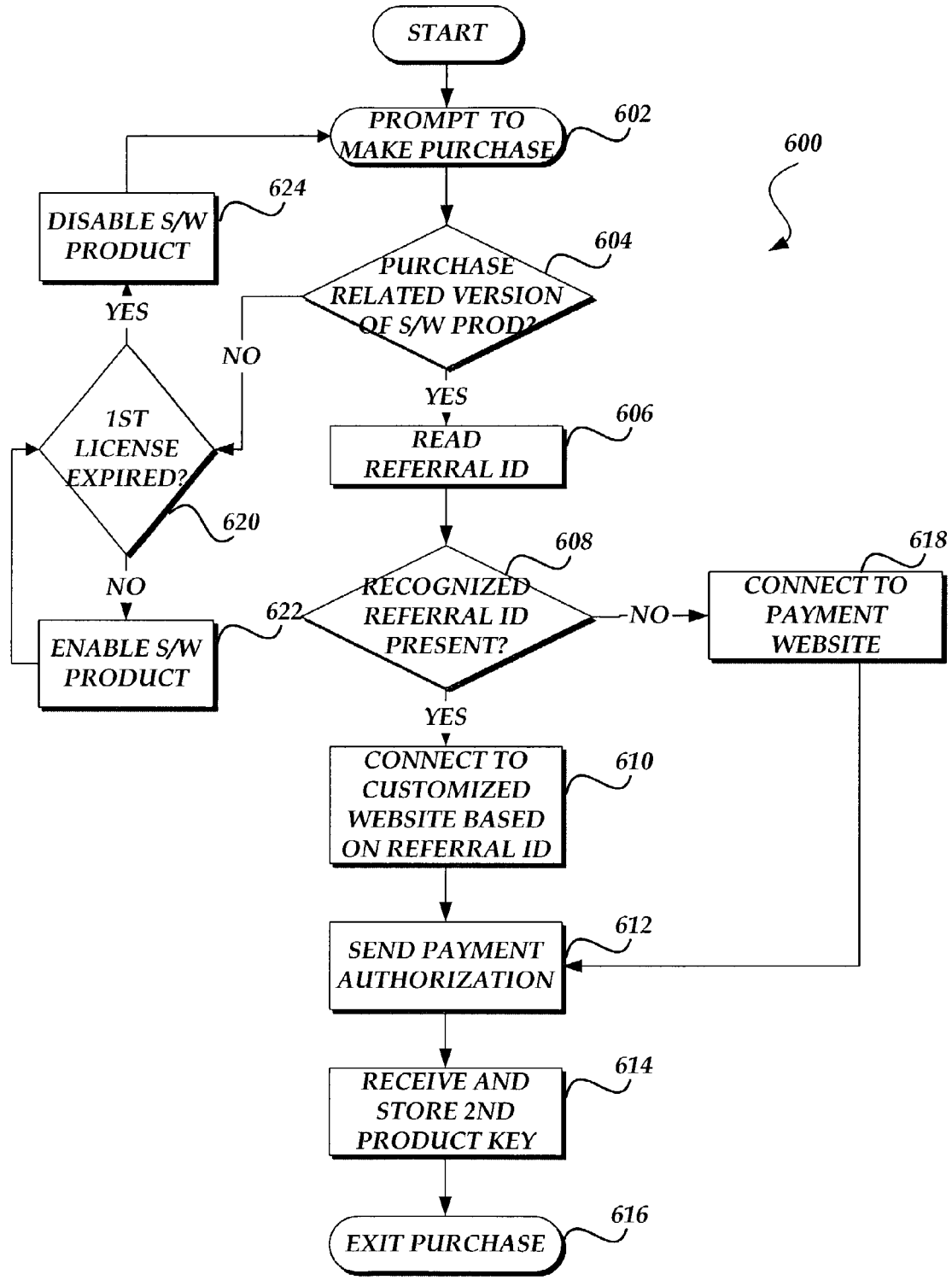
FIG. 6 is a flow diagram illustrating the conversion of a product directly with a product manufacturer provided in an actual embodiment of the present invention.

Referring now to FIG. 6, a routine 600 illustrating a purchase made directly from a product manufacturer in an actual embodiment of the present invention will be described. The routine 600 begins at block 602, where the customer 22 is prompted to make a purchase related to the software product currently in use. For instance, a customer may purchase the subscription version of a previously installed trial software product. Alternatively, a customer may purchase the unlimited version of a previously installed subscription software product. Next, the routine 600 continues from block 602 to block 604 where a determination is made as to whether the customer 22 will make a related purchase online directly from the product manufacturer. If the customer 22 agrees to make a related purchase, the routine 600 continues from block 604 to block 608.

At block 608, a determination is made as to whether a recognized referral ID 16 is stored at the client computer. A referral ID is recognized if it can be branded such that a payment website may be customized with the corresponding product distributor logo and advertisements. If a recognized referral ID 16 is stored at the client computer, the routine 600 continues from block 608 to block 610, where the client computer 24 is connected to a product manufacturer Web site that recognizes the referral ID 16 customizes the Web site based on the referral ID 16. For instance, if the referral ID 16 is a referral ID for "BEST BUY," the Web site may show a user interface with BEST BUY logos and other products available from BEST BUY. The routine 600 then continues from block 610 to block 612, where payment authorization is transmitted to make a purchase related to the software product currently installed. For instance, a user may provide a credit card number to authorize the purchase.

If a recognized referral ID 16 is not stored on the client computer 22, the routine 600 continues from block 608 to block 618, where the client computer is connected to a generic product manufacturer payment Web site. Since a referral code is not sent to the site, the site will not be customized based on the product distributor. The routine 600 then continues from block 618 to block 612, where payment authorization is transmitted to make a purchase related to the software product currently installed. Next, the routine 600 continues from block 612 to block 614, where, in exchange for payment authorization, a second product key 340 is received from the product manufacturer Web site and stored on the client computer 24. Next, the routine 600 continues from block 614 to block 616 where the routine 600 terminates.

If, at block 604, it is determined that the customer 22 did not agree to make a purchase related to the software product currently installed, the routine 600 continues from block 604 to block 620. At block 620, a determination is made as to whether the first license 338 that enables to software product to operate has expired. If the first license 338 has not expired, the routine 600 continues from block 620 to block 622, and from block 622 back to block 620, where the software product is enabled and until the first license 338 expires.

If at block 620, the first license 338 has expired, the routine 600 will continue from block 620 to block 624, where the software product is disabled. Next, the routine 600 continues from block 624 to block 602, where the customer 22 is again prompted to make a purchase related to the software product currently installed.

Figure 7:
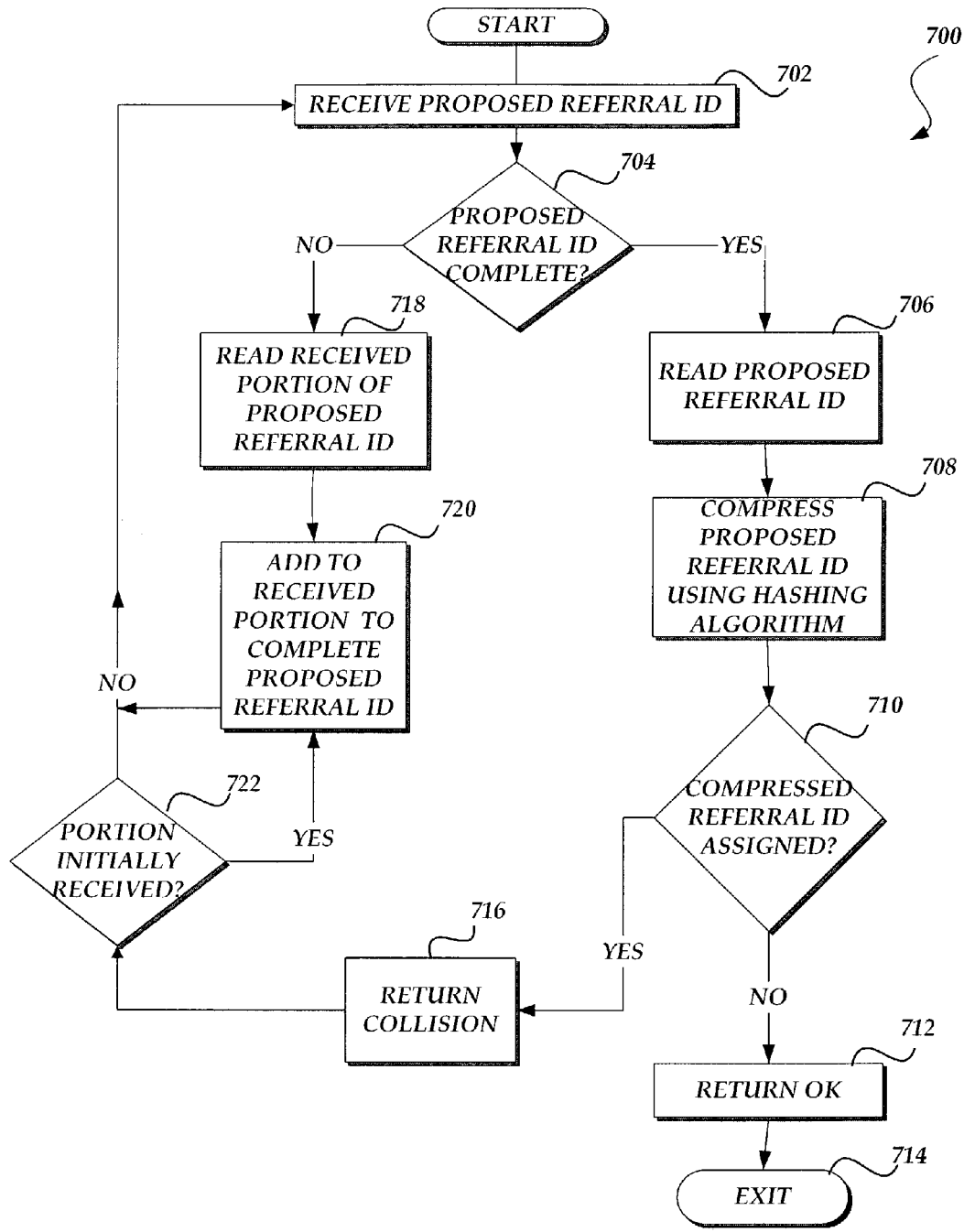
FIG. 7 is a flow diagram illustrating the operation of a referral identifier generator and tester provided in an actual embodiment of the present invention.

Turning now to FIG. 7, a routine 700 the operation of a referral code generator 440 provided in an actual embodiment of the present invention will be described. The routine 700 begins at block 702, where a proposed referral ID or a portion thereof is provided. Here, product manufacturers may input desired referral IDs in a complete format. Alternatively, input portions of a proposed referral ID or input portions that are completed by referral code generator 440 may be received to verify their compatibility with existing referral IDs. Next the routine 700 continues from block 702 to block 704, where a determination is made as to whether the proposed referral ID has the required number of characters. If the required number of characters is not present, the routine 700 continues from block 704 to block 718 where the received portion of the proposed referral ID is read and stored. Here, product manufactures may have input a number of characters of the desired referral ID at block 702, which are less than the total number of characters for the referral ID. The routine 700 will then operate to complete the proposed referral ID with the word provided characters included.

Next the routine 700 continues from block 718 to block 720 where the received portion of the proposed referral ID is completed by adding a selection of characters to the received portion sufficient to meet the required number of characters for a referral ID. The routine 700 then branches back to block 702 where the completed proposed referral ID is received for processing. If the required number of characters is present, the routine 700 continues from block 704 to block 706 where the proposed referral ID is read for processing.

The routine 700 continues from block 706 to block 708, where the proposed referral ID is compressed using a hashing algorithm. In one embodiment, referral IDs may be transmitted over the telephone. However telephone transmission requires a compressed version of the referral ID. Accordingly, the referral ID is compressed using a hashing algorithm.

The routine 700 continues from block 708 to block 710, where a determination is made as to whether the compressed version of the proposed referral ID has already been assigned to a product distributor. Here, the compressed version is evaluated for hashing collisions with existing referral IDs. If the compressed version has been assigned, the routine 700 continues from block 710 to block 716, where the routine 700 returns a collision indicator, thereby rejecting the proposed referral ID.

The routine 700 then continues from block 716 to block 722 where a determination is made as to whether the proposed referral ID initially received was a complete proposed referral ID or a portion thereof. If the initial proposed referral ID was a complete proposed referral ID, the routine 700 branches back to block 702. If the initial proposed referral ID was a portion thereof, the routine 700 branches back to block 720 described above, where a different selection of characters is generated and added to the proposed portion to complete another proposed referral ID. The routine 700 then branches back to block 702 described above.

If, at block 710, the compressed version of the proposed referral ID has not been assigned, the routine 700 continues from block 710 to block 712, where the proposed referral ID is approved. A visual indicator may be provided indicating approval of the referral ID. The routine 700 then exits at block 714.

Based on the foregoing, it should be appreciated that embodiments of the invention provide methods and systems for referral ID tracking. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for using referral data to track referrals, product sell-through and to compensate a product distributor comprising:

assigning, by a sever computer, a referral identifier to a product distributor, wherein the referral identifier is produced by a referral code generator and comprises a required number of characters, the referral code generator performing the steps of:

receiving, by the server computer, a portion of a proposed referral identifier, the received portion comprising a number of characters which is less than the required number of characters;

adding, by the server computer, a selection of characters to the portion of the proposed referral identifier sufficient to meet the required number of characters for the referral identifier and to produce a complete proposed referral identifier which includes the portion of the proposed referral identifier;

compressing, by the server computer, the complete proposed referral identifier into a compressed referral identifier, using a hashing algorithm, to transmit the referral identifier determining, by the server computer, whether the compressed complete proposed referral identifier has been assigned by evaluating the compressed complete proposed referral identifier for hashing collisions with other existing referral identifiers; and approving, by the server computer, the compressed complete proposed referral identifier, when there are no hashing collisions between the compressed complete proposed referral identifier and the other existing referral identifiers, for assigning as the referral identifier, for transmission to the product distributor, wherein approving the compressed complete proposed identifier comprises providing a visual indicator indicating approval of the compressed complete proposed referral identifier;

associating the referral identifier with a product;

receiving and storing the referral identifier at the server computer;

determining, at the server computer, whether a purchase relating to the product has occurred;

determining that a purchase relating to the product has occurred, identifying the product distributor based on the referral identifier; and providing referral data to determine compensation for the identified product distributor.

2. The method of claim 1, wherein the purchase relating to the product comprises the purchase of an unlimited version of a previously installed trial product.

3. The method of claim 1, wherein the purchase relating to the product comprises the purchase of a subscription version of the product.

4. The method of claim 1, wherein the purchase relating to the product comprises the renewal of a subscription version of the product.

5. The method of claim 1, wherein the purchase relating to the product comprises the purchase of a subscription version of a previously installed unlimited product.

6. The method of claim 1, wherein the purchase relating to the product comprises the purchase of a subscription version of a previously installed trial product.

7. The method of claim 1, wherein the product distributor comprises an original equipment manufacturer.

8. The method of claim 1, wherein the product distributor comprises a retail store.

9. The method of claim 1, wherein the referral data comprises the referral identifier, a first product key, a first license identifier, a second product key, an activation date of the product, and a conversion date of the product.

10. The method of claim 9, wherein the first product key provides full use of the product for a limited period of time and the second product key provides full use of the product for an unlimited period of time.

11. The method of claim 10, wherein the activation date comprises a date that use of the first product key is licensed and the conversion date comprises a date that use of the second product key is licensed.

12. The method of claim 11, wherein compensation for the identified product distributor is determined based on a time difference between the activation date and the conversion date.

13. The method of claim 11, wherein the product comprises a trial product, and further comprising:
receiving a first product key and a hardware identifier at the server computer;
storing the first product key, the referral identifier, the hardware identifier, and an installation date for the product; and
transmitting a first license identifier for the product to a sender of the referral identifier that enables full use of the product for a limited time trial.

14. The method of claim 13, further comprising:
receiving the referral identifier and a payment to purchase an unlimited version of the trial product at a web site;
branding the web site based on the referral identifier; and
transmitting a second product key that may be used to convert the trial product to an unlimited version of the product.

15. The method of claim 14, further comprising:
receiving a request to license the unlimited version of the product at the server computer, the request comprising the second product key, and the first license identifier;
transmitting a second license identifier that enables full use of the product for an unlimited period of time;
storing the conversion date;
identifying the referral data based on the first license identifier; and
determining a time difference between the installation date of the trial product and the conversion date of the trial product.

16. The method of claim 1, wherein the product comprises an unlimited product.

17. The method of claim 1, further comprising providing referral data to be audited by one or more product distributors and one or more authorized parties.

18. A method for providing referral data to compensate a distributor, as the distributor of a software product, comprising:
displaying a request for a first product key and a referral identifier, wherein the referral identifier is produced by a referral code generator and comprises a required number of characters, the referral code generator performing the steps of:
receiving, by a server computer, a portion of a proposed referral identifier, the received portion comprising a number of characters which is less than the required number of characters;
adding, by the server computer, a selection of characters to the portion of the proposed referral identifier sufficient to meet the required number of characters for the referral identifier and to produce a complete proposed referral identifier which includes the portion of the proposed referral identifier;
compressing, by the server computer, the complete proposed referral identifier into a compressed referral identifier, using a hashing algorithm, for transmission;
determining, by the server computer, whether the compressed complete proposed referral identifier has been assigned by evaluating the compressed complete proposed referral identifier for hashing collisions with other existing referral identifiers; and
approving, by the server computer, the compressed complete proposed referral identifier, when there are no hashing collisions between the compressed complete proposed referral identifier and the other existing referral identifiers as the referral identifier, for transmission, to the product distributor, wherein approving the compressed complete proposed identifier comprises providing a visual indicator indicating approval of the compressed complete proposed referral identifier;
receiving and storing the first product key and the referral identifier;
generating a referral code;
transmitting the referral code to a server computer;
receiving and storing a first license identifier from the server computer that includes an issue date of a license to use the software product;
sending payment and the referral identifier to make a purchase related to the software product;
receiving a second product key to convert the software product; and
transmitting the first license identifier and the second product key to the server computer to associate with the referral code.

19. The method of claim 18, wherein the referral code comprises the first product key and the referral identifier.

20. The method of claim 18, wherein transmitting the referral code comprises:
selecting a telephone as a means to transmit the referral code; and
transmitting the referral code, wherein the referral code comprises the first product key and the compressed referral identifier over the telephone.

21. A system for tracking product sell-through by using referral data, comprising:
a client computer comprising a display, a memory, a central processing unit, and a storage device containing computer-readable instructions for execution on the central processing unit, the computer-readable instructions operative to cause the client computer to store and transmit a license request comprising referral data to a server computer and to receive from the server computer a license identifier in response to the request, the license identifier operative to allow the execution of a software product installed on the client computer; and a server computer comprising a memory, a central processing unit, and a storage device containing computer-readable instructions for execution on the central processing unit of the server computer, the computer-readable instructions operative to cause the server computer to receive and store the referral data from the client computer in a database within the mass storage device, and to associate the referral data with a distributor of the product installed on the client computer, wherein the referral data comprises a referral identifier which comprises a required number of characters and which is produced by a referral code generator, the referral code generator operative to cause the server computer to receive a portion of a proposed referral identifier, wherein the received portion comprises a number of characters which is less than the required number of characters, add a selection of characters to the portion of the proposed referral identifier sufficient to meet the required number of characters for the referral identifier and to produce a complete proposed referral identifier which includes the portion of the proposed referral identifier, compress the complete proposed referral identifier into a compressed referral identifier, using a hashing algorithm, for transmission, determine whether the compressed complete proposed referral identifier has been assigned by evaluating the compressed complete proposed referral identifier for hashing collisions with other existing referral identifiers, and approve the compressed complete proposed referral identifier, when there are no hashing collisions between the compressed complete proposed identifier and the other existing referral identifiers, for assigning as the referral identifier, wherein approving the compressed complete proposed identifier comprises providing a visual indicator indicating approval of the compressed complete proposed referral identifier.

22. The system of claim 21, wherein the server computer is further operative to provide access to the referral data to one or more authorized parties.

23. A computer-readable storage medium comprising computer-executable instructions which, when executed by a computer, cause the computer to perform a method for using referral data to track product sell through and determine compensation for a distributor of a software product, the method comprising:

receiving and storing referral data, wherein the referral data comprises a first product key, a referral identifier, an activation date, and a conversion date for a trial software product, wherein the referral identifier comprises a required number of characters and is produced by a referral code generator, the referral code generator performing the steps of:

receiving a portion of a proposed referral identifier, the received portion comprising a number of characters which is less than the required number of characters;

adding a selection of characters to the portion of the proposed referral identifier sufficient to meet the required number of characters for the referral identifier and to produce a complete proposed referral identifier which includes the portion of the proposed referral identifier;

compressing the complete proposed referral identifier into a compressed referral identifier, using a hashing algorithm, to transmit the referral identifier;

determining whether the compressed complete proposed referral identifier has been assigned by evaluating the compressed complete proposed referral identifier for hashing collisions with other existing referral identifiers; and approving the compressed complete proposed referral identifier, when there are no hashing collisions between the compressed complete proposed referral identifier and the other existing referral identifiers as the referral identifier, for transmission, to the product distributor, wherein approving the compressed complete proposed identifier comprises providing a visual indicator indicating approval of the compressed complete proposed referral identifier;

determining whether the referral identifier is a recognized referral identifier stored at a client computer;

connecting the client computer to a product manufacturer Web site that recognizes the referral identifier and wherein the product manufacturer Web site is customized based on the referral identifier, wherein the customized Web site comprises a user interface with logos and other products available from the product manufacturer;

connecting the client computer to a generic product manufacturer Web site;

storing and transmitting a first license identifier to enable the trial software product to run for a predetermined period of time;

determining that the predetermined period of time has expired;

prompting a user to purchase an unlimited version of the trial software product;

receiving the referral identifier;

providing a user interface customized based on the referral identifier for receiving payment authorization purchasing the unlimited version of the trial software product; and transmitting a second product key to convert the trial software product to the unlimited version of the trial software product.

24. The computer-readable storage medium of claim 23, further comprising:

receiving a request to license the unlimited version of the trial software product, the request comprising the second product key and the first license identifier to associate with the referral identifier and the activation date of the trial software product;

storing and transmitting a second license identifier to enable use of the unlimited software product; and identifying the referral data based on the first license identifier.

25. The computer-readable storage medium of claim 24, further comprising:

storing the conversion date of the trial software product;

determining a time difference between the installation date of the trial product and the conversion date of the trial software product; and determining compensation for a distributor of the trial software product based on the time difference between the installation date of the trial software product and the conversion date of the trial software product, the second product key, and the identity of the distributor of the trial software product.

26. The computer-readable storage medium of claim 25, wherein the second product key comprises computer-readable data identifying where the unlimited version of the trial software product was purchased and further comprising determining compensation for a distributor of the trial software product based on where the unlimited version of the trial software product was purchased and the identity of the distributor of the trial software product.

* * * * *